United States Patent [19]
Brown

[11] 3,770,873
[45] Nov. 6, 1973

[54] PLASTIC ELECTRICAL JUNCTION BOX

[75] Inventor: Leland A. Brown, Huntington Station, N.Y.

[73] Assignee: Electrical Fittings Corporation, East Farmsdale, N.Y.

[22] Filed: Nov. 17, 1971

[21] Appl. No.: 199,587

[52] U.S. Cl............................ 174/58, 174/53, 220/27
[51] Int. Cl.................................................. H02g 3/08
[58] Field of Search........................ 174/65, 58, 53; 220/27, 3.9, 3.92; 248/DIG. 6

[56] References Cited
UNITED STATES PATENTS

| | | | |
|---|---|---|---|
| 3,176,869 | 4/1965 | Kinney | 174/58 X |
| 2,927,149 | 3/1960 | Kern | 220/27 X |
| 1,944,706 | 1/1934 | Calderwood | 220/27 |
| 2,959,633 | 11/1960 | Palmer et al. | 174/53 UX |
| 2,016,284 | 10/1935 | Knight | 220/27 X |
| 3,365,156 | 1/1968 | Beck | 174/58 UX |

*Primary Examiner*—Bernard A. Gilheany
*Assistant Examiner*—D. A. Tone
*Attorney*—Howard C. Miskin

[57] ABSTRACT

An electrical junction box is integrally molded of a synthetic organic plastic and includes rectangular side, rear and end walls defining a cavity for receipt of an electrical fixture and is open at its front. A pair of laterally spaced knock-out plugs are located on each end wall forwardly of its rear edge and each plug is delineated by front and side lines of weakness and a rear slot. A recess with parallel tool guiding side faces extends from each slot to the rear wall, the recess front edge being the slot rear edge and being downwardly rearwardly offset from the slot front edge. Integrally formed blocks extend along the inside corners between the rear wall and the end walls and have rear horizontal grooves with restricted throats oblique to the box rear face.

11 Claims, 7 Drawing Figures

PATENTED NOV 6 1973
3,770,873
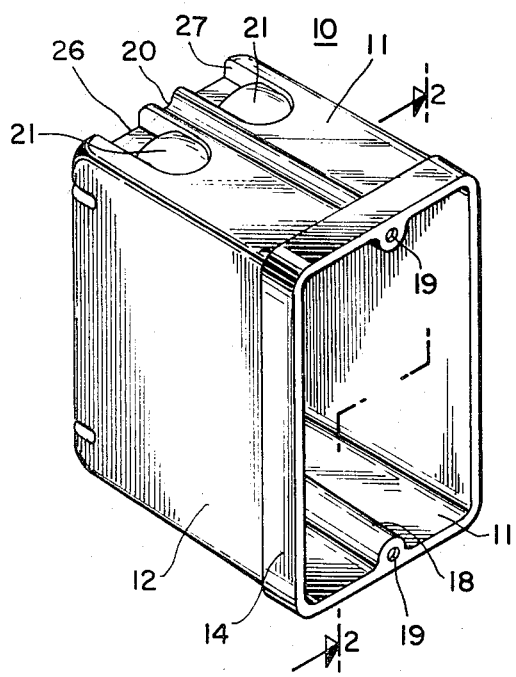
Fig. 1.
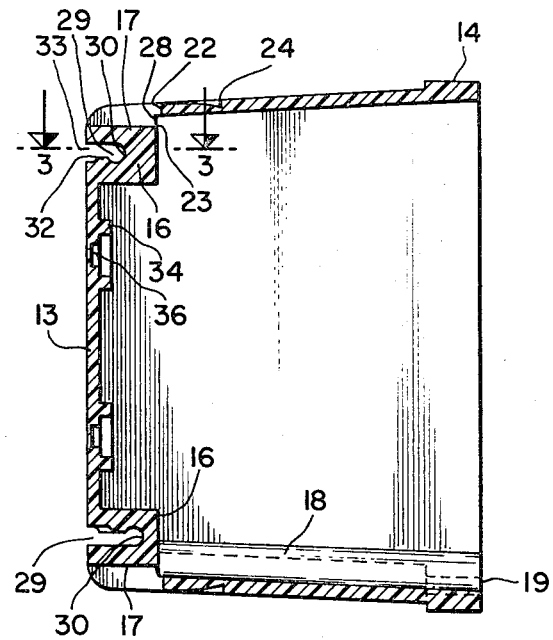
Fig. 2.
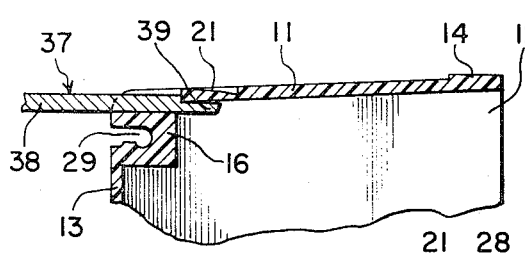
Fig. 4.
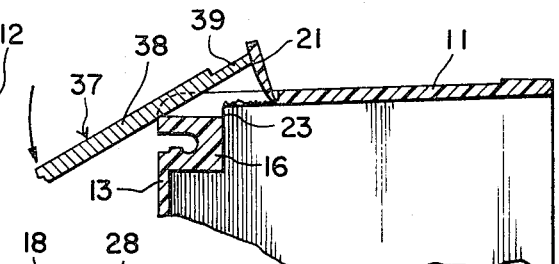
Fig. 5.
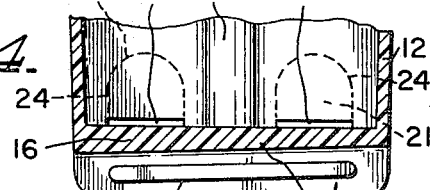
Fig. 3.
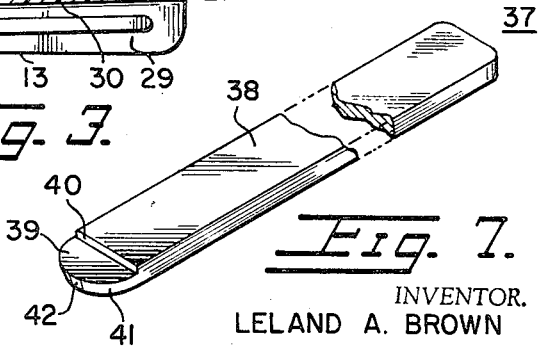
Fig. 6.
Fig. 7.
INVENTOR.
LELAND A. BROWN
BY Howard C. Miskin
ATTORNEY.

PLASTIC ELECTRICAL JUNCTION BOX

BACKGROUND OF THE INVENTION

The present invention relates generally to improvements in electrical hardware and it relates more particularly to an improved electrical junction box.

The conventional electrical junction box, whether of the type employed as an outlet box or as a conductor junction box, is generally formed of metal, either by die casting or by stamping and forming from sheet metal. The most widely used junction boxes are those which are formed of sheet metal and die cast metal and these are provided with several knock-out plugs in its walls, the knock-out plugs being delineated by score lines to facilitate the separation of selected plugs to provide entrance openings at desired locations for the electrical conductors or cables. The conventional junction box possesses numerous drawbacks and disadvantages. They are heavy and bulky devices which are expensive to fabricate and ship, difficult to employ and mount, especially on thin wall construction, of little versatility and otherwise leave much to be desired.

SUMMARY OF THE INVENTION

It is a principal object of the present invention to provide an improved electrical junction box.

Another object of the present invention is to provide an improved integrally molded electrical junction box.

Still another object of the present invention is to provide a molded plastic electrical junction box having easily separable knock-out plugs for providing selected conduit and cable access openings.

A further object of the present invention is to provide a junction box of the above nature characterized by its ruggedness, low cost, ease of mounting and high versatility and adaptability.

The above and other objects of the present invention will become apparent from the reading of the following description taken in conjunction with the accompanying drawing which illustrates a preferred embodiment thereof.

In a sense the present invention contemplates the provision of an electrical junction box comprising an integrally molded box open at its front and including top and bottom end walls, side walls and a rear wall, defining a cavity for receipt of an electrical fixture, at least one of the walls having lines of weakness formed therein delineating a part of the periphery of a knock-out plug and a tool receiving slot delineating the remainder of the knock-out plug periphery.

In the preferred form of the junction box which is formed of a synthetic organic polymeric resin, a pair of laterally spaced knock-out plugs are located in the box top and bottom walls a short distance forwardly of the box rear wall or base, the plug delineating slots being positioned along the rear edge of the plugs. Transversely extending blocks are integrally formed along the box top and bottom inside rear corner edges, and have forward edges which delineate the rear edges of the plug delineating slots and which are rearwardly inwardly offset relative to the slot front edges. Grooves are formed in the box top and bottom walls extending from the plug slots to the box rear edge and have parallel tool guiding faces which extend to the ends of each slot. A plug knock-out tool is provided which is of the width of the grooves and has a leading end of a thickness equal to or slightly less than the vertical distance between the slot front and rear edges. Formed in the rear face of each block and extending horizontally for the full lengths thereof are transverse slots having oblique restricted throats to slideably engage fasteners and facilitate the mounting of the box. Selected plugs may be knocked out merely by sliding the tool along a respective groove into engagement with a corresponding slot and lowering the tool outer end to fracture the plug delineating lines of weakness and separate the plug. The edges of the fracture are smoothed.

The improved electrical junction box is rugged, inexpensive, highly adaptable and easy to mount, and selected knock-out plugs may be easily and rapidly removed.

BRIEF DESCRIPTION OF THE DRAWING

FIG. 1 is a front perspective view of an electrical junction box embodying the present invention;

FIG. 2 is a sectional view taken along line 2 — 2 in FIG. 1;

FIG. 3 is a sectional view taken along line 3 — 3 in FIG. 2;

FIG. 4 is a fragmentary view similar to FIG. 2 illustrating the insertion of a tool attendent to the separation of a knock-out plug;

FIG. 5 is a view similar to FIG. 4, the tool being shown in its levered plug separating position;

FIG. 6 is a view similar to FIG. 4 with the plug removed and the tool being illustrated in a plug opening deburring position; and FIG. 7 is a perspective view, partially broken away, of the plug separating tool.

DESCRIPTION OF THE PREFERRED EMBODIMENT

Referring now to the drawing, which illustrates a preferred embodiment of the present invention, the reference numeral 10 generally designates the improved electrical junction box which may be of standard dimensions and molded in a conventional manner of any suitable synthetic organic polymeric resin, thermoplastic or thermoset, and advantageously of a nonflammable nature. The box 10 includes integrally formed substantially rectangular substantially similar top and bottom end walls 11, similar side walls 12 and a rear wall, or base 13, the front borders of the end and side walls 11 and 12 being reinforced by an integrally formed outerwardly projecting shallow peripheral band 14.

Disposed along the top and bottom inner corners of box 10 and extending for the full width of box 10 are transversely extending blocks 16 which are integrally formed with side and rear walls 12 and 13 and have horizontal top and bottom, or outer faces 17 which are inwardly offset a short distance from the underfaces of the respective adjacent end walls 11. Formed on the inner faces of end walls 11 and extending from the front to the rear of end walls 11 are medially positioned ribs 18 which have tapped axial coupling bores 19 in their forward ends. A longitudinally extending medial groove 20 is formed in each end wall 11 from the rear edge of band 14 to the rear edge of end wall 11.

A pair of laterally spaced knock-out plugs 21 are formed in the rear section of each end wall 11 on opposite sides of the groove 20. The bottom face of each plug 21 is coplanar with the underface of a corresponding end wall and its top face is convex. The rear face 22 of each plug 21 is free and linear and vertical and extends transversely and is positioned forward of and above the upper front edge of the respective block 17. The side and forward edges of each plug 21 are defined by a U-shaped line of weakness 24 which is a line of reduced thickness in end wall 11, the side legs of the line of weakness 24 extending forwardly from the ends of rear face 22 and being joined by an arcuate front section. The top face of the plug 21 slopes downwardly from its longitudinal medial axis to the line of weakness 24.

A longitudinal recess 26 located in end wall 11 extends rearwardly from each plug rear face 22 to the rear edge of end wall 11 and has parallel side faces 27, which are colinear with the side legs of the line of weakness 24. The base of each recess 26 is defined by a corresponding block top face 17. The front edge 23 of each block outer face 17 is rearwardly inwardly offset from and parallel to the inner edges of plug rear faces 22 and defines therewith transverse slots 28.

A longitudinal horizontal groove 29 is formed in the rear face of and extends for the full length of each block 16, the inner face or base 30 of the groove being oblique to the plane of the rear face of rear wall 13, as shown in FIG. 3. A longitudinal rib 32 is formed on a side face of each groove 29 parallel to and spaced rearwardly of the base 30 thereof and extends between points short of the ends of the respective groove 29 to define a restricted throat 33 to the inner section of groove 29. The grooves 29 facilitate the mounting of the box 10, the grooves 29 being slid at the shallow end thereof over the head of a suitably secured fastener with the enlarged head of the fastener located between groove base 30 and ridge 32, and sliding the box laterally to draw the rear wall 13 into tight engagement with the fastener supporting wall as urged by the fastener head bearing on the inside face of ridge 32. To also facilitate the mounting of the box 10, a pair of vertically spaced medially located annular ridges 34 are formed on the inner face of rear wall 13 and a circular recess 36 coaxial with each ridge 34 is formed in the rear wall front face to provide a thin easily piercable section in rear wall 13 coaxial with each ridge 34.

The tool 37 for removing selected plugs 21 is formed of a hard material, for example a tool steel, and includes an elongated rectangular shank 38 of a width equal to or slightly less than that of recess 26. The distal end section 39 of tool 37 is integrally formed with shank 38 and is of lesser thickness and delineated therefrom by a transverse shoulder 40. The thickness of the distal section 39 is approximately equal to the vertical spacing between slot edges 22 and 23 and the end periphery of distal section 39 is arcuate and the length of the distal section 39 is less than that of plug 21. The peripheral face 41 of distal section 39 is bevelled to provide a cutting edge 42 along the plane of the offset face of distal section 39. The underface of distal section 39 and shank 38 are coplanar.

In removing a knock-out plug 21, tool 37 is inserted through the rear end of a recess 26 and slid along the base 17 thereof as guided by side faces 27 to slide the tool distal section 39 through slot 28 until the shoulder 40 abuts the plug rear face 22 and the top face of tool distal section 39 underlies the underface of plug 21, as shown in FIG. 4. The outer end of tool 37 is then depressed to swing it counter-clockwise about the rear upper edge of block 16, as shown in FIG. 5, to sever or rupture end wall 11 along line of weakness 24 and substantially detach the plug 21 therefrom which may then be removed. The ruptured edges of the opening resulting from the separation of a plug 21 is then deburred or smoothed by inserting the distal section 39 into the opening, as shown in FIG. 6, and rotating and otherwise manipulating the tool 27 to debur and smooth the opening by means of the cutting edge 41.

While groove 29 is illustratively shown at an angle to the plane of the rear face of rear wall 13, it could be parallel also.

While there has been described and illustrated a preferred embodiment of the present invention, it is apparent that numerous alterations, omissions and additions may be made without departing from the spirit thereof.

What I claim is:

1. An electrical junction box comprising an integrally molded box open at its front and including top and bottom end walls, side walls and a rear wall, defining a cavity for the receipt of an electrical fixture, at least one of said walls having lines of weakness formed therein delineating a part of the periphery of a knock-out plug and a tool receiving slot providing communication between the interior and exterior of said box and delineating the remainder of said knock-out plug periphery and being approximately equal in length to the maximum width of said plug, the surface of the knock-out plug which faces the interior of box being substantially flat and being located outwardly relative to the portion of the box on the opposite side of the slot, whereby to permit the receipt and positioning of a plug knock-out tool with an outer edge approximately the shape of said lines of weakness.

2. The electrical junction box of claim 1 wherein said knock-out plug is located in the rear portion of one of said end walls, said slot being positioned along the rear of said knock-out plug.

3. The electrical junction box of claim 2 wherein said slot is forward of and parallel to the rear edge of said respective end wall.

4. The electrical junction box of claim 3 including a recess formed in said respective end wall extending from said slot to the rear edge of said end wall, and having a shoulder defining base below said end wall and having a leading edge delineating the rear edge of said slot and being inwardly rearwardly offset relative to the forward edge of said slot.

5. The electrical junction box of claim 4 including a laterally spaced pair of said knock-out plugs and recesses positioned on said end wall.

6. The electrical junction box of claim 4 including a laterally spaced pair of said knock-out plugs and recesses positioned on each of said end walls.

7. The electrical junction box of claim 4 wherein said recess has longitudinally extending parallel side faces defining a tool guide.

8. The electrical junction box of claim 4 including a block integrally formed with said box and extending along the inner faces of said end and rear walls at the corner thereof, the top face of said block defining said base of said recess.

9. An electrical junction box comprising an integrally molded box open at its front end and including top and bottom end walls, side walls and a rear wall, defining a cavity for the receipt of an electrical fixture, at least one of said end walls having lines of weakness formed therein delineating a part of the periphery of a knock-out plug and tool receiving slot delineating the remainder of said knock-out plug periphery and positioned along the rear of said knock-out plug and forward of and parallel to the rear edge of said respective end wall, said end wall having a recess formed therein extending from said slot to the rear edge of said end wall, said recess having a shoulder defining base below said end wall and having a leading edge delineating the rear edge of said slot and being inwardly rearwardly offset relative to the forward edge of said slot, a block integrally formed with said box and extending along the inner faces of said end and rear walls at the corner thereof, the top face of said block defining said base of said recess and said block having a groove formed in and extending the length of the rear face thereof and having a restricted throat rearwardly of its inner end.

10. The electrical junction box of claim 9 wherein said groove is oblique to the rear face of said rear wall.

11. An electrical junction box comprising an integrally molded box open at its front end and including top and bottom end walls, side walls and a rear wall, defining a cavity for the receipt of an electrical fixture, at least one of said end walls having lines of weakness formed therein delineating a part of the periphery of a knock-out plug, said end wall having a recess formed therein, a block integrally formed with said box and extending along the inner faces of said end and rear walls at the corner thereof, the top face of said block defining said base of said recess and said block having a groove formed in and extending the length of the rear face thereof and having a restricted throat rearwardly of its inner end.

* * * * *